United States Patent [19]
Palmer

[11] Patent Number: 4,885,555
[45] Date of Patent: Dec. 5, 1989

[54] INTERCONNECTION FOR HIGH FIDELITY SIGNALS

[76] Inventor: Donald E. Palmer, 1275 Vicente #189, Sunnyvale, Calif. 94086

[21] Appl. No.: 135,776

[22] Filed: Dec. 21, 1987

[51] Int. Cl.[4] .............................................. H04B 3/28
[52] U.S. Cl. ....................................... 333/12; 174/32; 174/34
[58] Field of Search ................. 333/12, 24 R; 174/32, 174/34, 105 R; 336/174, 175; 381/94

[56] References Cited

U.S. PATENT DOCUMENTS

| | | | |
|---|---|---|---|
| 687,141 | 11/1901 | Everest | 174/115 |
| 1,752,320 | 4/1930 | White | 174/32 X |
| 1,915,442 | 6/1933 | Nyquist | 333/12 X |
| 2,001,847 | 5/1935 | Lockrow | 333/12 |
| 2,865,006 | 12/1958 | Sabaroff | 333/33 |
| 4,538,023 | 8/1985 | Brisson | 173/115 |
| 4,754,102 | 6/1988 | Dzurak | 333/1 X |

FOREIGN PATENT DOCUMENTS

| | | | |
|---|---|---|---|
| 1153809 | 9/1963 | Fed. Rep. of Germany | 333/12 |
| 1441097 | 3/1969 | Fed. Rep. of Germany | 333/12 |
| 1640612 | 10/1970 | Fed. Rep. of Germany | 333/12 |
| 1050935 | 1/1954 | France | 333/12 |

*Primary Examiner*—Eugene R. LaRoche
*Assistant Examiner*—Benny Lee
*Attorney, Agent, or Firm*—Townsend and Townsend

[57] ABSTRACT

An apparatus for minimizing degradation of fidelity of a signal in a transmission line intended for carrying signals of wavelengths greater than the length of said transmission line and wherein the signals are of frequencies over several octaves, wherein a structure of ferromagnetic material is employed encircling a transmission line and the ferromagnetic material, preferably a toroid, serves as core to a transformer with a secondary having a termination in a substantially short circuited load whereby ringing signals in the transmission line are dissipated in the secondary circuit. Therefore, the invention causes the frequency response of a cable to be unimpaired for the desired signal, and it simultaneously and selectively couples the undesired reflection currents into a secondary circuit where they are dissipated.

11 Claims, 3 Drawing Sheets

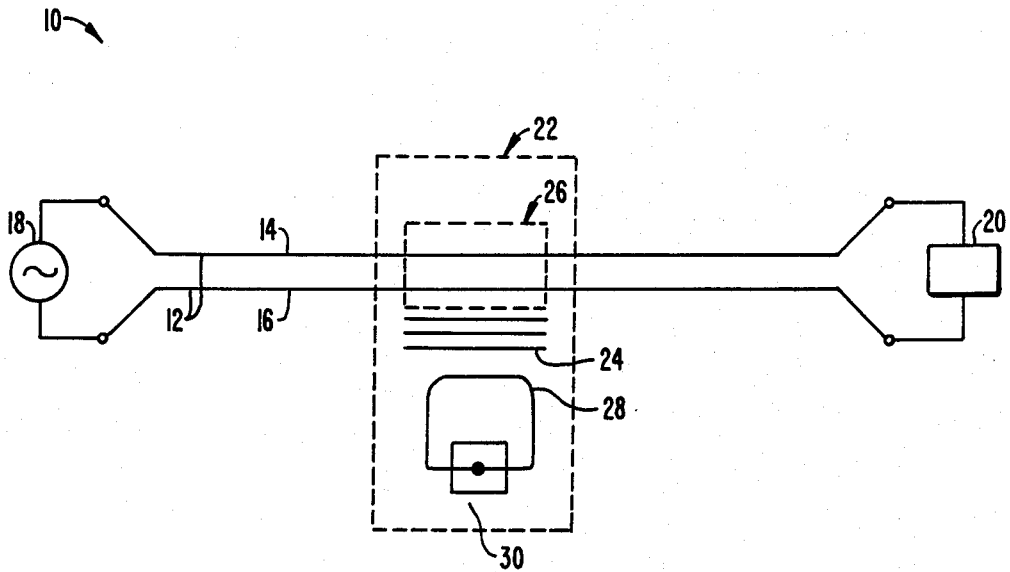
FIG._1.
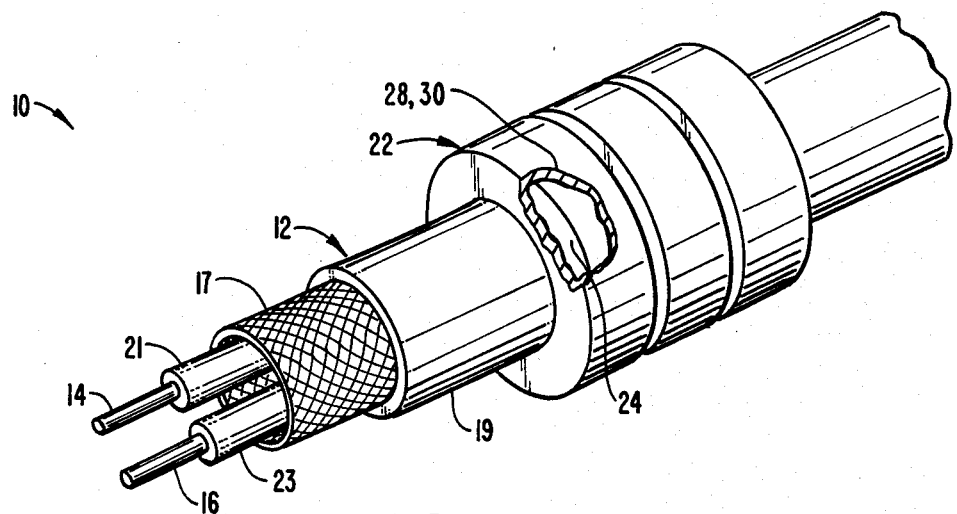
FIG._2.

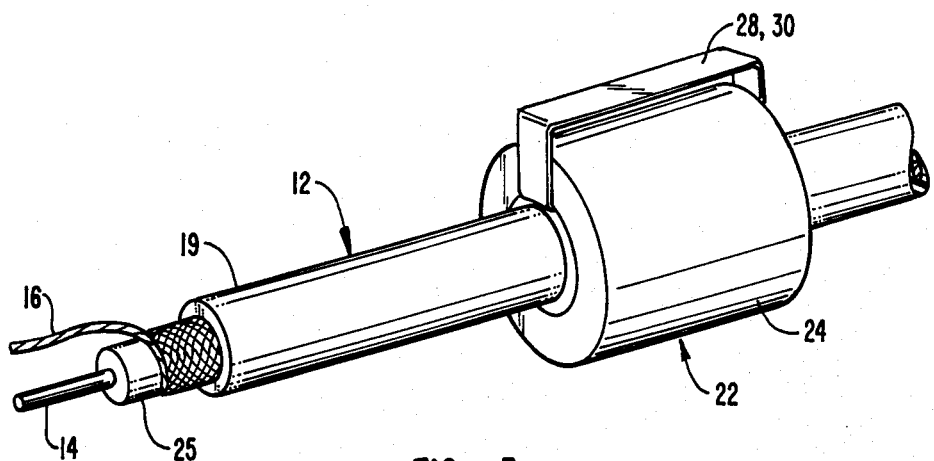
FIG._3.
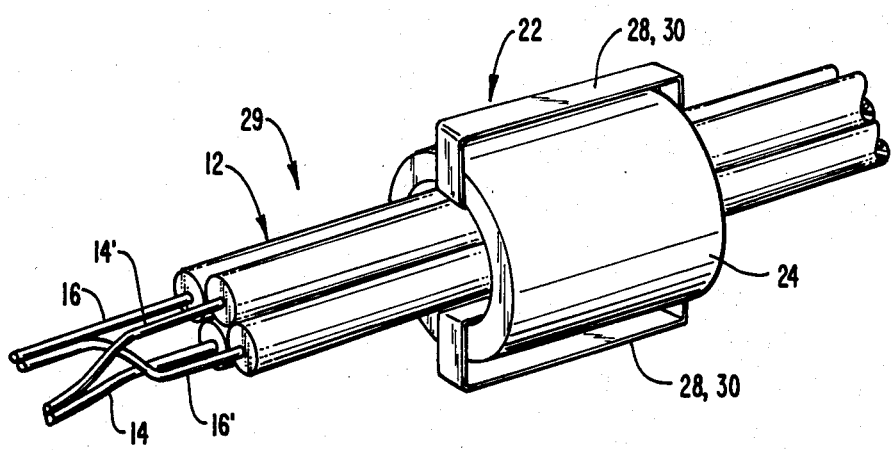
FIG._4.

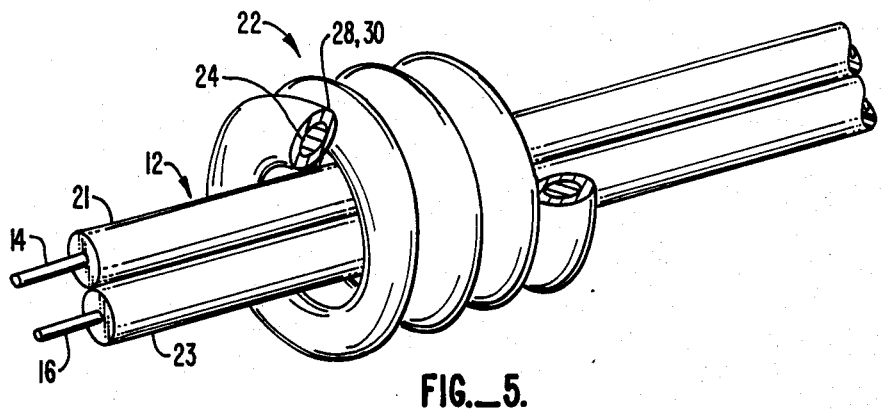
FIG._5.
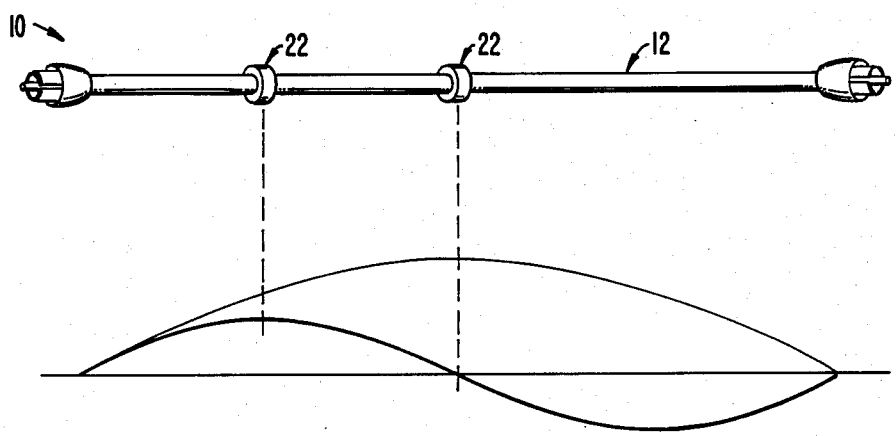
FIG._6.

INTERCONNECTION FOR HIGH FIDELITY SIGNALS

BACKGROUND OF THE INVENTION

This invention relates to transmission lines wherein the wavelength of signals carried on the transmission lines is generally longer than the length of the transmission lines, such as in audio signal and high fidelity sound reproduction applications. The invention has particular application where the range of frequencies is greater than several octaves and therefore wherein spurious oscillations in a transmission line can have potentially significant impact on the fidelity of a complex signal carried by the transmission line.

In contrast to long transmission lines where the impedance of the cable is matched to the impedance of the termination loads, it is conventional in short transmission lines to reduce the impedance, and more particularly the resistance, of the cable to a minimum to reduce the electrical resistive loss in the cable. When used in high fidelity audio signal interconnection cabling, as between components in an audio component system, such an approach introduces secondary problems, such as audible enhancement of the "brightness" frequencies (1000 Hz to 2000 Hz range) and a loss in clarity in the high audio frequencies. The prior art in high fidelity audio cables is to provide means for varying the impedance of the cable over the frequency range to reduce the "brightness."

It has been found that one of the primary causes of spurious oscillation (ringing) is reflections in low loss interconnecting cables. The mechanism and extent to which the ringing interacts with the audio signal are not generally understood, and the significance of the interaction appear to have been underestimated in the audio high fidelity field. The ringing phenomenon causes audible enhancement of the "brightness" in the upper midrange, which exaggerates sibilance and transient attacks and causes distortion at high frequencies. Moreover it appears that the ringing causes standing waves in a transmission line which are not equal and opposite in amplitude and phase in the signal line and in the signal return line. Identification of this phenomenon led to the present invention.

The conventional solution for reducing radio frequency oscillations in transmission lines is to use frequency selective means in series with the signal lines. The equivalent of the frequency selective means is an r.f. choke. However, such an approach has several disadvantages. Impedance matching is required as well as sufficient frequency separation to allow attenuation of the spurious signal without attenuation of the desired signal. The present invention pursues an alternative approach.

The following patents and publications were uncovered in the course of research on the prior art of subject invention:

U.S. Pat. No. 4,538,023 issued Aug. 27, 1985 to Bruce A. Brisson describes an audio signal cable wherein impedance is varied over the frequency range to overcome phase distortion due to variation in group delay. The invention therein relates to a cable wherein the outer and inner conductors are constructed of helically wound wires of different lengths, the shorter wires being toward the center and wherein the impedance of the cable wires radially from a maximum at the center of the cable. This technology represents current commercially-available technology. This patent does not address the issue of reducing undesired ringing due to signal reflections. A cable derived from this construction is commercially available which is less subject to ringing wherein the cable is constructed with tuning stubs at each end.

U.S. Pat. No. 687,141 issued Nov. 29, 1901 to Everest describes a current transformer with a secondary circuit being wound around a magnetizable core and a primary consisting of a single conductor. Although superficially similarly constructed to the present invention, current transformers are designed to produce an output from the secondary which is used for measurement or external control. As will be apparent hereinafter, the present invention uses effects produced by a secondary for suppression of spurious currents in the primary.

SUMMARY OF THE INVENTION

According to the invention, an apparatus for minimizing degradation of fidelity of a signal in a transmission line intended for carrying signals of wavelengths greater than the length of said transmission line and wherein the signals are of frequencies over several octaves, wherein a structure of ferromagnetic material is provided, preferably a toroid surrounding both a signal and a signal return line of a transmission line which serves as core to a transformer with a secondary circuit having a termination in a substantially short circuited load. Therefore, the invention causes the electrical characteristics of a cable to be unimpaired for the desired signal, and it simultaneously and selectively couples the undesired reflected currents into a secondary circuit where they are dissipated. Cables constructed in accordance with the invention may be realized with extremely low inductance and low resistance conductors without risk of undesired ringing.

BRIEF DESCRIPTION OF THE DRAWINGS

FIG. 1 is a schematic diagram of an apparatus according to the invention illustrating a single loading core.

FIG. 2 is a perspective view of a shielded twisted pair cable constructed in accordance with the invention.

FIG. 3 is a perspective view of a coaxial cable constructed in accordance with another embodiment of the invention.

FIG. 4 is a perspective view of a portion of a quad wire cable with oppositely coupled pairs having a toroidal transformer constructed in accordance with the invention.

FIG. 5 is a perspective view of an apparatus according to the invention showing a helical loading core.

FIG. 6 is a perspective view of an apparatus according to the invention showing a plurality of loading cores.

DESCRIPTION OF SPECIFIC EMBODIMENTS

Referring to FIG. 1, there is shown a schematic diagram of an apparatus 10 according to the invention which comprises the combination of a variety of a transmission line 12 having a signal path 14 and a signal return path 16, coupled between a signal source 18 and a signal load 20 through at least one loading core 22. According to the invention, the loading core 22 comprises a unit 24 of ferromagnetic material adjacent to and encircling both the signal path 14 and the signal return path 16 in a region herein designated primary region 26. The primary region 26 serves as the primary coupling of the loading core 22 for both the signal path 12 and the signal return path 14. In addition the loading core 22 comprises a secondary element 28 adjacent to and typically encircling the unit 24, the secondary element 24 terminating in a short circuit load 30 or other low impedance load.

The loading core 22 is disposed along the transmission line 12 a point between the signal source 18 and the signal load 20 corresponding to a maximum current point of a primary standing wave mode of the ringing. The frequency of the ringing is a function of the length of the transmission line, the fundamental frequency having a wavelength equal to twice the length of the transmission line. The placement of the maximum current point is a function of the termination impedance of the signal source 18 and the signal load 20. If the signal source 18 and the signal load 20 appear as an open circuit at r.f. frequencies, then the point of maximum current for the fundamental is at the halfway point of the transmission line cable.

The secondary element 28 of loading core 22 is disposed to cut the magnetic field lines of the transmission line 16. Properly positioned, the secondary element 28 provides maximum coupling of standing wave current in the primary region 26 into the secondary element 28 and to the secondary load 30. Because the secondary load 30 is shorted, any imbalance in current between the signal path 14 and the signal return path 16 is coupled to the shorted secondary load 30 and dissipated in heat. The dissipation of such spurious net current flow in this manner is the primary mechanism for suppression of undesired ringing.

The basic configuration of the invention may be realized in various embodiments, as explained hereinafter.

Referring to FIG. 2, there is shown a perspective view of a shielded twisted pair cable apparatus 10 constructed in accordance with the invention. The numbering corresponds to the numbering of FIG. 1. Not shown are the signal source 18 and signal load 20, nor is the entire length of the cable apparatus depicted. The signal path 14 and the signal return path 16 are disposed within insulation 21 and 23 in a twisted pair relationship within a shield 17, which in turn is enclosed by an insulative sheath 19 forming together the transmission line 12.

The loading core 22 comprises preferably a toroid of a ferromagnetic material, such as ferrite or iron, which is preferably coated by a highly conductive material such as copper or silver, which forms as a single unit the secondary element 28 and shorted load 30. Such a structure is inexpensive and simple to manufacture in large volumes, as no hand work is needed. Loading cores 22 may be selected to be of an inner diameter conforming to the outer diameter of the transmission line 12, and they may be stacked together to increase the effectiveness at a single region.

Alternatively, as shown in the apparatus 10 in FIG. 6, loading cores 22 may be disposed at a plurality of locations along the transmission line 12, each location preferably corresponding to a maximum current point of one of the standing wave modes, as illustrated by a representation of two standing wave modes in connection with FIG. 6.

Referring now to FIG. 3, there is shown a still further realization of an apparatus 10 according to the invention wherein the loading core 22 comprises a toroid unit 24 having as the secondary 28 and secondary load 30 a simple wire in a closed loop. The loading core 22 is shown mounted on a further type of transmission line, namely, a coaxial cable formed by a center conductor signal path 14 and a braided shield return path 16 separated by a dielectric 25 and enclosed within a sheath 19. The advantage of this construction is its extreme simplicity, since it is readily assembled from common components. However, its effectiveness is not diminished by its simplicity.

FIG. 4 illustrates still another embodiment of the invention in connection with a quadrature conductor cable transmission line 12 of the type used in certain types of modulators. The advantage of this cable is its low characteristic impedance. The cable comprises an insulated first signal path 14 and an insulated second signal path 14' which are shorted together at each termination, an insulated first signal return path 16 and insulated second signal return path 16' which are similarly shorted together at each termination. The respective signal paths are disposed in quadrature relationship in a bundle 29 with the signal return paths. In accordance with the invention, at least one loading core 22 is disposed about the bundle 29, and at least one braid or ribbon conductor is provided as the secondary 28 and short circuit load 30 for a toroid unit 24.

FIG. 5 illustrates still another embodiment in accordance with the invention. In this embodiment, a twisted pair transmission line 12 having an insulated signal path 14 and insulated signal return path 16 are provided in combination with a loading core 22 which comprises a wire containing iron in its core unit 24 and coated with a highly conductive layer of material forming the secondary 28 and shorted load 30. The wire is helically wound around the transmission line 12. The iron core is permeable and less conductive than the coating layer. The advantage of this structure is that it can be constructed without disassembling the structure containing the transmission line 12 or otherwise disconnecting the transmission line 12 from the signal source and the signal load.

The invention is effected by mounting at least one loading core 22 including means 24 of ferromagnetic material to a transmission line 12 within the electromagnetic field between a signal source 18 and a signal load 20 with the ferromagnetic means 24 being disposed at a position along said transmission line to suppress at least a primary standing wave mode of ringing, coupling a secondary circuit means 28 to said ferromagnetic material means to cut magnetic field lines of the transmission line 12, shorting the secondary circuit means 28 through a short circuit secondary load 30 thereby to terminate spurious current flows on the transmission line 12 which generate a net current, and coupling the signal load 20 by at least a signal path 14 and a return path 16 via the transmission line to the signal source 18. The transmission line 12 is for conveying a coherent signal of equal but opposite current flows simultaneously on each of one of the signal paths 14 and 16, thereby generating no net current through the loading core 22.

The invention has now been explained with reference to specific embodiments. Other embodiments will be apparent to those of ordinary skill in this art in light of this disclosure. Therefore, it is not intended that this invention be limited except as indicated by the appended claims.

I claim:

1. An apparatus for suppressing spurious current flow in a transmission line carrying signals of wavelengths greater than the length of said transmission line and wherein the signals are of frequencies over several octaves, said apparatus for electrically interconnecting a signal source and a signal load, said apparatus including said transmission line and comprising:
- at least one means of ferromagnetic material surrounding said transmission line within an electromagnetic field established between said signal source and said signal load and disposed at a position along said transmission line within the middle half relative to the longitudinal length of said transmission line in order to suppress at least the primary standing wave mode of the fundamental frequency of ringing, wherein said ferromagnetic means is a wire, containing iron, helically wound around said transmission line; and
- secondary circuit means coupled to said ferromagnetic material means, said secondary circuit means including a short circuit secondary load for terminating spurious current flows on said transmission line which generate a net current.

2. An apparatus for suppressing spurious current flow in a transmission line carrying signals of wavelengths greater than the length of said transmission line and wherein the signals are of frequencies over several octaves, said apparatus for electrically interconnecting a signal source and a signal load, said apparatus including said transmission line and comprising:
- at least one means of ferromagnetic material surrounding said transmission line within an electromagnetic field established between said signal source and said signal load and disposed at a position along said transmission line within the middle half relative to the longitudinal length of said transmission line in order to suppress at least the primary standing wave mode of the fundamental frequency of ringing; and
- secondary circuit means coupled to said ferromagnetic material means, said secondary circuit means including a short circuit secondary load for terminating spurious current flows on said transmission line which generate a net current;
- wherein said secondary circuit means is an electrically conductive ribbon loop.

3. The apparatus according to claim 2 wherein said ferromagnetic means is a torroid containing iron.

4. The apparatus according to claim 2 wherein said ferromagnetic means is a torroid comprising ferrite.

5. An apparatus for suppressing spurious current flow in a transmission line carrying signals of wavelengths greater than the length of said transmission line and wherein the signals are of frequencies over several octaves, said apparatus for electrically interconnecting a signal source and a signal load, said apparatus including said transmission line and comprising:
- at least one means of ferromagnetic material surrounding said transmission line within an electromagnetic field established between said signal source and said signal load and disposed at a position along said transmission line within the middle half relative to the longitudinal length of said transmission line in order to suppress at least the primary standing wave mode of the fundamental frequency of ringing; and
- secondary circuit means coupled to said ferromagnetic material means, said secondary circuit means including a short circuit secondary load for terminating spurious current flows on said transmission line which generate a net current;
- wherein said secondary circuit means is an electrically conductive coating disposed upon said ferromagnetic means forming said short circuit load.

6. The apparatus according to claim 5 wherein said ferromagnetic means is a toroid containing iron.

7. The apparatus according to claim 5 wherein said ferromagnetic means is a toroid comprising ferrite.

8. The apparatus according to claim 5 wherein said ferromagnetic means is a helix containing iron.

9. A method for minimizing degradation of fidelity of a signal in an apparatus including a transmission line carrying signals of wavelengths greater than the length of said transmission line and wherein the signals are of frequencies of more than one octave, said apparatus for coupling to said transmission line, said method comprising:
- mounting at least one means of ferromagnetic material so as to surround said transmission line within an electromagnetic field established between said signal source and said signal load and positioning said ferromagnetic material means along said transmission line within the middle half relative to the longitudinal length of said transmission line in order to suppress at least the primary standing wave mode of ringing;
- coupling a secondary circuit means to said ferromagnetic material means;
- shorting said secondary circuit means through a short circuit secondary load, by using as said secondary circuit means an electrically conductive ribbon loop for terminating spurious current flows on said transmission line which generate a net current; and
- coupling said signal load via said transmission line to said signal source.

10. An apparatus for suppressing spurious current flow in a transmission line carrying signals of wavelengths greater than the length of said transmission line and wherein the signals are of frequencies over several octaves, said apparatus for electrically interconnecting a signal source and a signal load, said apparatus comprising:
- a four-wire group coupled in a balanced configuration having a termination at each end to form a transmission line with said signal load wherein adjacent wires are insulated from one another at each end of said four-wire group and are thereby able to be in opposing polarity and diagonally opposite wires are connected at each end in order to be of matching polarity, said diagonally opposite wires being connected to each other at each said termination;
- at least one means of ferromagnetic material surrounding said transmission line within an electromagnetic field established between said signal source and said signal load and disposed at a position along said transmission line within the middle half relative to the longitudinal length of said transmission line in order to suppress at least the primary standing wave mode of ringing; and
- secondary circuit means coupled to said ferromagnetic material means, said secondary circuit means including a short circuit secondary load for terminating spurious current flows on said transmission line which generate a net current;
- wherein said signal load is coupled by at least a signal path comprising a first pair of said diagonally opposite wires and a return path comprising a second pair of said diagonally opposite wires via said transmission line to said signal source, said transmission line conveying a coherent signal of equal but opposite current flows simultaneously on each of one of said signal paths, thereby generating no net current through said ferromagnetic material means.

11. A method for minimizing degradation of fidelity of a signal in an apparatus including a transmission line carrying signals of wavelengths greater than the length of said transmission line and wherein the signals are of frequencies of more than one octave, said apparatus for coupling to said transmission line, said method comprising:

mounting at least one means of ferromagnetic material so as to surround said transmission line within an electromagnetic field established between said signal source and said signal load and positioning said ferromagnetic material means along said transmission line within the middle half relative to the longitudinal length of said transmission line in order to suppress at least the primary standing wave mode of ringing;

coupling a secondary circuit means to said ferromagnetic material means;

shorting said secondary circuit means through a short circuit secondary load, by using as said secondary circuit means an electrically conductive coating disposed upon said ferromagnetic means forming said short circuit secondary load for terminating spurious current flows on said transmission line which generate a net current; and coupling said signal load via said transmission line to said signal source.

* * * * *